(12) United States Patent
Lee et al.

(10) Patent No.: US 12,244,585 B2
(45) Date of Patent: Mar. 4, 2025

(54) APPARATUS AND METHOD OF AUTHENTICATING DEVICE THROUGH INFRARED TRANSMISSION

(71) Applicant: Samsung Electronics Co., Ltd., Suwon-si (KR)

(72) Inventors: Minju Lee, Suwon-si (KR); Jinho Kim, Suwon-si (KR); Sukun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 18/078,636

(22) Filed: Dec. 9, 2022

(65) Prior Publication Data

US 2023/0198982 A1    Jun. 22, 2023

Related U.S. Application Data

(63) Continuation of application No. PCT/KR2022/014343, filed on Sep. 26, 2022.

(30) Foreign Application Priority Data

Dec. 20, 2021    (KR) .......................... 10-2021-0182912

(51) Int. Cl.
*H04L 9/40*    (2022.01)
(52) U.S. Cl.
CPC ................ *H04L 63/0853* (2013.01)
(58) Field of Classification Search
CPC .............................................. H04L 63/0853
See application file for complete search history.

(56) References Cited

U.S. PATENT DOCUMENTS

| 9,032,498 B1 * | 5/2015 | Ben Ayed | G06F 21/35 |
| | | | 726/9 |
| 11,363,460 B1 * | 6/2022 | Van Vliet | H04W 12/63 |
| 2017/0264608 A1 | 9/2017 | Moore et al. | |

FOREIGN PATENT DOCUMENTS

| JP | 2004267327 | * | 9/2004 |
| JP | 4341026 | | 10/2009 |

(Continued)

OTHER PUBLICATIONS

International Search Report dated Dec. 28, 2022, in PCT Application No. PCT/KR2022/014343.

*Primary Examiner* — Kristie D Shingles
(74) *Attorney, Agent, or Firm* — STAAS & HALSEY LLP

(57) ABSTRACT

An electronic device including a memory storing instructions; and a processor that executes the instructions to perform a process including: identifying a registered device through a scan, after identifying the registered device, connecting with the registered device based on identification information of the registered device and a preset password, to establish a communication connection with the registered device, requesting, through the established communication connection, infrared codeset information from the registered device, and after receiving the requested infrared codeset information from the registered device, transmitting, to the registered device through the established communication connection, a request for authentication of the registered device, and transmitting, to the registered device over infrared light, an authentication signal including the infrared codeset information, for authenticating the registered device.

20 Claims, 13 Drawing Sheets

(56) References Cited

FOREIGN PATENT DOCUMENTS

| | | |
|---|---|---|
| JP | 2017-208083 | 11/2017 |
| JP | 2019-186823 | 10/2019 |
| KR | 10-2015-0070813 | 6/2015 |
| KR | 10-2018-0065428 | 6/2018 |
| KR | 10-1884351 | 8/2018 |
| KR | 10-2021832 | 9/2019 |
| KR | 10-2026696 | 9/2019 |
| KR | 10-2020-0002742 | 1/2020 |
| KR | 10-2020-0050674 | 5/2020 |
| KR | 10-2136543 | 8/2020 |
| KR | 10-2021-0026834 | 3/2021 |

\* cited by examiner

APPARATUS AND METHOD OF AUTHENTICATING DEVICE THROUGH INFRARED TRANSMISSION

CROSS-REFERENCE TO RELATED APPLICATIONS

This application is a continuation application of International Application No. PCT/KR2022/014343, filed on Sep. 26, 2022, in the Korean Intellectual Property Receiving Office and claiming priority to Korean Patent Application No. 10-2021-0182912, filed on Dec. 20, 2021, in the Korean Intellectual Property Office, the disclosures of which are incorporated by reference herein in their entireties.

BACKGROUND

1. Field

The disclosure relates to a method of connecting Internet of Things (IoT) devices, such as smart appliances, to a home access point, registering the IoT devices in an IoT cloud, and controlling the IoT devices.

2. Description of Related Art

A user may generally use mutual authentication based on certificates, a personal identification number (PIN), or a quick response (QR) code for device authentication between an electronic device, such as a television (TV), and a registered device, such as a robot vacuum cleaner or an air conditioner, to be authenticated during a process of registering an Internet of Things (IoT) device in a cloud. In this case, direct intervention of the user may be needed for a device authentication method through the mutual authentication based on certificates, a PIN input, or a QR code scan.

The mutual authentication based on certificates may be a method of authentication between the electronic device and the registered device in which the user directly presses or clicks a certain physical button of the registered device and the like during an authentication process when the electronic device and the registered device respectively include device certificates mutually trusted by each other.

The PIN input may be a method of authentication between the electronic device and the registered device in which the user directly inputs a PIN generated by the registered device to the electronic device.

The QR code scan may be a method of authentication between the electronic device and the registered device in which the user directly scans a QR code generated by the registered device by using a camera of the electronic device and the like.

Under the assumption that an air conditioner including Wi-Fi and an infrared receiver is connected to a network and registered in an IoT cloud by using a TV including a display unit and an infrared transmitter, that is, an easy setup scenario, the TV may be an electronic device for transmitting infrared light and the air conditioner may be a registered device for receiving the infrared light.

The air conditioner may activate a software-enabled access point (SoftAP) corresponding to a communication connection standby state for easy setup, and the TV may search for a nearby Wi-Fi access point, find the SoftAP activated by the air conditioner, and establish device-to-device (D2D) connection to the SoftAP. Then, device authentication may be proceeded with in a method of mutual authentication based on certificates, the TV may display a user guide that instructs a user to press a certain button of the air conditioner, and the user may need to be in front of the air conditioner and press the guided certain button of the air conditioner.

When the user presses the certain button of the air conditioner, the air conditioner may confirm that authentication is complete and approve mutual authentication, and the TV may transmit, to the air conditioner, personal information, such as access point information needed for connection to a home access point and a token for registration in the IoT cloud, and may complete the registration of the air conditioner.

Because searching for and connecting to the SoftAP for IoT device registration are performed by using the identification information and password information, which are known to anyone, of the registered device, a third party may access the registered device activating the SoftAP and waiting for setup at any time by connecting to the SoftAP, and a plurality of devices may be connected to the SoftAP. Accordingly, a device authentication process may be essential, and the user may intervene such that the ownership of a device may not be transferred to the third party. However, a typical D2D authentication method may need the user's direct intervention and cause use inconvenience.

SUMMARY

Example embodiments of the disclosure may provide a method performed by an electronic device, the method including: identifying a registered device through a scan; after identifying the registered device, connecting with the registered device based on identification information of the registered device and a preset password, to establish a communication connection with the registered device; requesting, through the established communication connection, infrared codeset information from the registered device; and after receiving the requested infrared codeset information from the registered device, transmitting, to the registered device through the established communication connection, a request for authentication of the registered device, and transmitting, to the registered device over infrared light, an authentication signal including the infrared codeset information, for authenticating the registered device.

The method may including, in response to success in authenticating the registered device, receiving, from the registered device through the established communication connection, an authentication success signal; after receiving the authentication success signal, transmitting, to the registered device through the established communication connection, information needed for connection of the registered device to a first external device, and transmitting, through the established communication connection, information needed for registration of the registered device in a second external device.

The method may include, after transmitting the information needed for connection of the registered device to the first external device and the information needed for registration of the registered device in the second external device, terminating the established communication connection with the registered device.

The method may include, in response to failure in authenticating the registered device, controlling the electronic device to output, on a screen, a user interface via which authentication of the registered device is performable by a user.

The method may include, in response to receiving, from the registered device through the established communication connection, an authentication failure signal, or when not receiving any response from the registered device for a preset time, determining that authentication of the registered device has failed.

The established communication connection may uses one of Wi-Fi communication, Bluetooth communication, Bluetooth low energy communication, and ZigBee communication.

The infrared codeset information may be information corresponding to a button, for authentication, of the registered device.

The authentication signal may include information of a preset region of media access control (MAC) of the electronic device, and infrared-type information indicating that the authentication signal is an infrared signal for device authentication.

Example embodiments of the disclosure may provide a non-transitory computer-readable storage medium storing instructions that, when executed by a processor, cause the processor to perform a method as described above.

Example embodiments of the disclosure may provide an electronic device including a memory storing instructions; and a processor that executes the instructions to perform a process including: identifying a registered device through a scan, after identifying the registered device, connecting with the registered device based on identification information of the registered device and a preset password, to establish a communication connection with the registered device, requesting, through the established communication connection, infrared codeset information from the registered device, and after receiving the requested infrared codeset information from the registered device, transmitting, to the registered device through the established communication connection, a request for authentication of the registered device, and transmitting, to the registered device over infrared light, an authentication signal including the infrared codeset information, for authenticating the registered device.

The process may include, in response to success in authenticating the registered device, receiving, from the registered device through the established communication connection, an authentication success signal, and, after receiving the authentication success signal, transmitting, to the registered device through the established communication connection, information needed for connection of the registered device to a first external device, and transmitting, through the established communication connection, information needed for registration of the registered device in a second external device.

The process may further include, after transmitting the information needed for connection of the registered device to the first external device and the information needed for registration of the registered device in the second external device, terminating the established communication connection with the registered device.

The electronic device may further include a display, wherein the process may further include, in response to failure in authenticating the registered device, control the electronic device to display a user interface on the display through which authentication of the registered device is performable by a user.

The process may further include, in response to receiving, from the registered device through the established communication connection, an authentication failure signal, or when not receiving any response from the registered device for a preset time, determining that authentication of the registered device has failed.

The established communication connection may use one of Wi-Fi communication, Bluetooth communication, Bluetooth low energy communication, and ZigBee communication.

The infrared codeset information may include information corresponding to a button, for authentication, of the registered device.

The authentication signal may include information of a preset region of MAC of the electronic device, and infrared-type information indicating that the authentication signal is an infrared signal for device authentication.

Example embodiments of the disclosure may provide a system including an electronic device; and a registered device. The electronic device may be configured to perform a process including: identifying the registered device through a scan, after identifying the registered device, connecting with the registered device based on identification information of the registered device and a preset password, to establish a communication connection with the registered device, requesting, through the established communication connection, infrared codeset information from the registered device, and after receiving the requested infrared codeset information from the registered device, transmitting, to the registered device through the established communication connection, a request for authentication of the registered device, and transmitting, to the registered device over infrared light, an authentication signal including the infrared codeset information, for authenticating the registered device. The registered device may be configured to perform a process including: establishing the communication connection with the electronic device after receiving the preset password from the electronic device, storing media access control (MAC) information of the electronic device, after receiving, from the electronic device, the request for the infrared codeset information through the established communication connection, transmitting, to the electronic device, the infrared codeset information through the established communication connection in response to receiving the request for the infrared codeset information from the electronic device, and after receiving the authentication signal over infrared light, performing the authentication of the registered device by using the authentication signal.

The process which the electronic device is configured to perform may include, in response to success in authenticating the registered device, receiving, from the registered device through the established communication connection, an authentication success signal; after receiving the authentication success signal, transmitting, to the registered device through the established communication connection, information needed for connection of the registered device to a first external device, transmitting, through the established communication connection, information needed for registration of the registered device in a second external device, and terminate the established communication connection. The process which the registered device is configured to perform may include: when the authentication of the registered device succeeds after performing the authentication by using the authentication signal, transmitting, to the electronic device, the authentication success signal, when receiving, from the electronic device, the information needed for registration in the second external device and the information needed for connection to the first external device, connecting the registered device to the first external device by using the information needed for connection to the first external device and registering the registered device in the second external device by using the first external device.

The authentication signal may further include information on a preset region of the MAC of the electronic device, and infrared-type information indicating that the authentication signal is an infrared signal for device authentication, and the process which the registered device is configured to perform may include, when performing the authentication by using the authentication signal, comparing the MAC information of the electronic device with the preset region of the MAC of the electronic device included in the authentication signal, determining whether the authentication signal is transmitted by the electronic device, when the authentication is determined to have been transmitted by the electronic device, determining whether the authentication signal is transmitted for the authentication of the registered device by verifying the infrared-type information, and when the infrared-type information is for the authentication of the registered device, performing an input to a button, for authentication, of the registered device, corresponding to the infrared codeset information.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
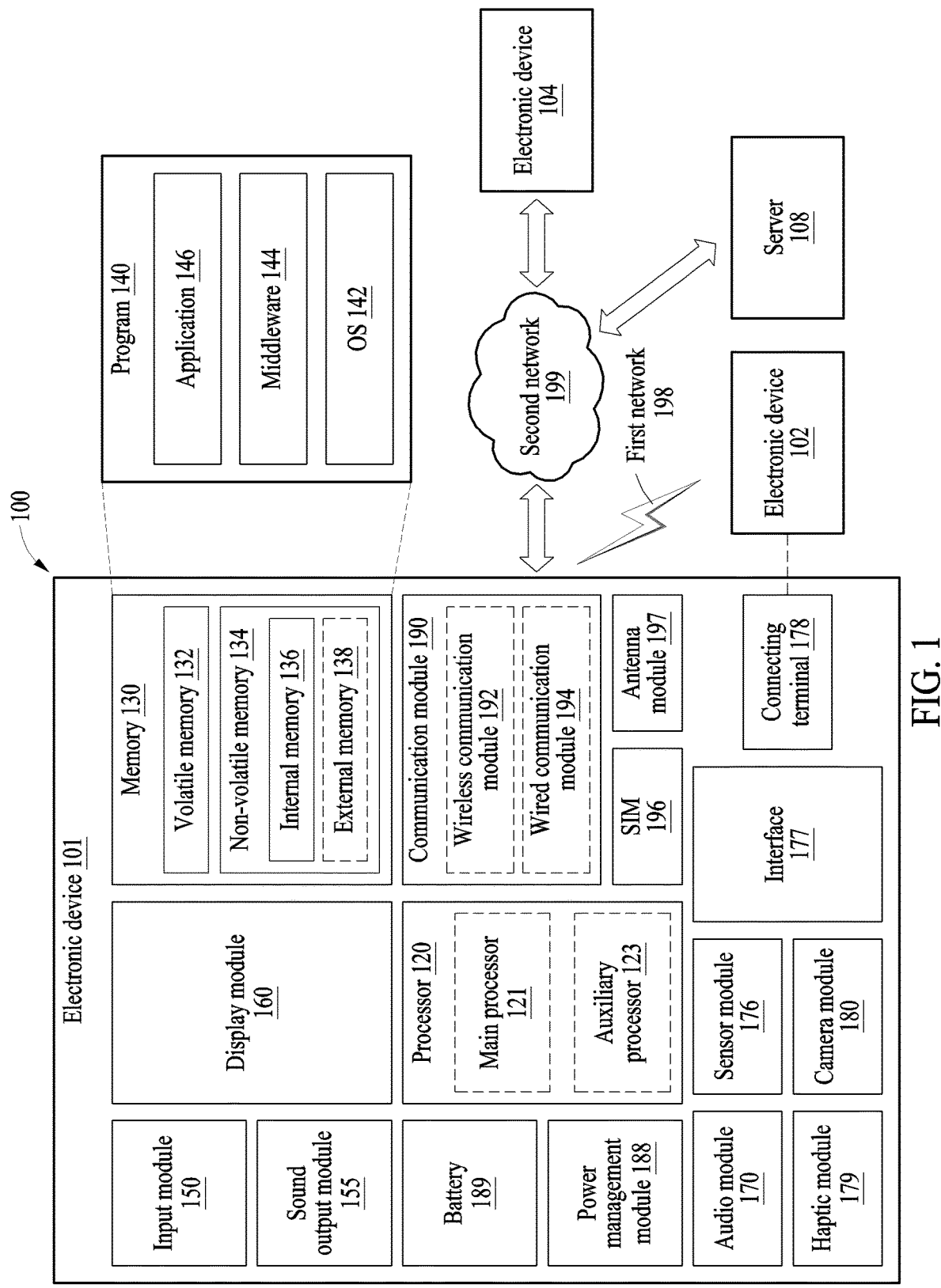
FIG. 1 is a block diagram illustrating an electronic device in a network environment, according to various example embodiments.

Hereinafter, examples will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Example embodiments of the disclosure may provide an electronic device and method of authenticating a registered device through infrared transmission, which may minimize a user's intervention by using infrared transmission when the electronic device authenticates the registered device.

Hereinafter, a method and apparatus for device authentication through infrared transmission will be described with reference to FIGS. 1 to 9.

FIG. 1 is a block diagram illustrating an electronic device 101 in a network environment 100, according to various example embodiments.

Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added to the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an example embodiment, the display module 160 may include a touch sensor adapted to detect a touch, or a pressure sensor adapted to measure the intensity of force of the touch.

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. According to an example embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an example embodiment, the external electronic device (e.g., the electronic device 104) may include an Internet-of-things (IoT) device. The server 108 may be an intelligent server using machine learning and/or a neural network. According to an example embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
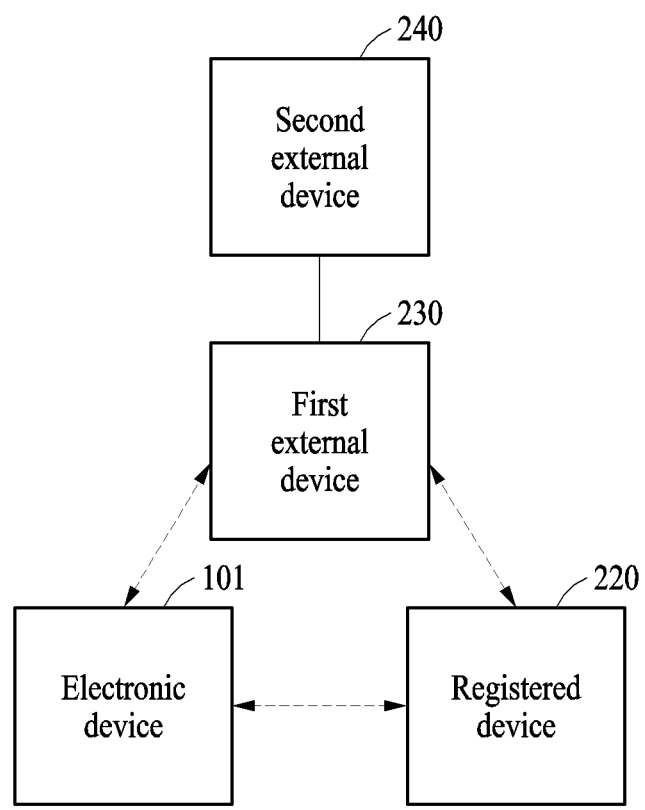
FIG. 2 is a diagram illustrating a schematic configuration of a system for performing device authentication over infrared light, according to an example embodiment.

FIG. 2 is a diagram illustrating a schematic configuration of a system for performing device authentication over infrared light, according to an example embodiment.

Referring to FIG. 2, the system for performing device authentication over infrared light may include the electronic device 101, a registered device 220, a first external device 230, and a second external device 240.

When identifying the registered device 220 through a scan, the electronic device 101 may perform communication connection through identification information of the registered device 220 and a preset password, when connecting for communication, may request the registered device 220 for infrared codeset information through communication, and when receiving the infrared codeset information from the registered device 220 through communication, request the registered device 220 for device authentication through communication, and transmit an authentication signal including the infrared codeset information to the registered device 220 over infrared light.

In this case, communication may be Wi-Fi communication. In addition, communication may be one of Bluetooth communication, Bluetooth low energy (BLE) communication, and ZigBee communication. The infrared codeset information may be information corresponding to a button, for authentication, of the registered device 220. The authentication signal may include information on a preset region of media access control (MAC) of the electronic device 101 such that the registered device 220 may verify the electronic device 101, infrared-type information indicating that the authentication signal is an infrared signal for device authentication, and the infrared codeset information. In this case, the preset region of MAC may be information corresponding to the last 2 bytes of a MAC address.

In response to receiving a signal corresponding to device authentication success from the registered device 220 through communication, the electronic device 101 may transmit information needed for registration in the second external device 240 to the registered device 220 through communication, transmit, to the registered device 220 through communication, information needed for connection to the first external device 230, and disconnect communication with the registered device 220. In this case, for example, the first external device 230 may be an access point and the second external device 240 may be an Internet of Things (IoT) cloud.

When determining that device authentication fails, the electronic device 101 may output, on a screen, a user interface via which a user performs a device authentication process. In this case, the electronic device 101, when receiving an authentication failure signal notifying that device authentication fails from the registered device 220 through communication, or when not receiving any response from the registered device 220 for a preset time, may determine that device authentication fails.

In addition, when receiving a request to connect for communication from the electronic device 101, in a communication connection standby state, the registered device 220 may receive a preset password and connect for communication, store MAC information of the electronic device 101, when receiving a request for infrared codeset information from the electronic device 101 through communication, transmit the infrared codeset information to the electronic device 101 through communication, and when receiving an authentication signal over infrared light, perform device authentication through the authentication signal.

The registered device 220 may transmit a signal corresponding to device authentication success to the electronic device 101 after performing the device authentication through the authentication signal, and when receiving, from the electronic device 101, information needed for registration in the second external device 240 and information needed for connection to the first external device 230, the registered device 220 may connect to the first external device 230 by using the information needed for connection to the first external device 230 and may register in the second external device 240 through the first external device 230 by using the information needed for registration in the second external device 240.

When performing device authentication by using the authentication signal, the registered device 220 may compare, to the information on the preset region of MAC of the electronic device 101 included in the authentication signal, the MAC information of the electronic device 101 that is stored when connecting for communication and verify the authentication signal is received from the electronic device 101, when the authentication signal is received from the electronic device 101, may verify the infrared-type information and verify that the authentication signal is received for device authentication, and when the infrared-type information is for device authentication, may perform device authentication by performing an input on the button, for authentication, of the registered device 220 corresponding to the infrared codeset information.

Figure 3:
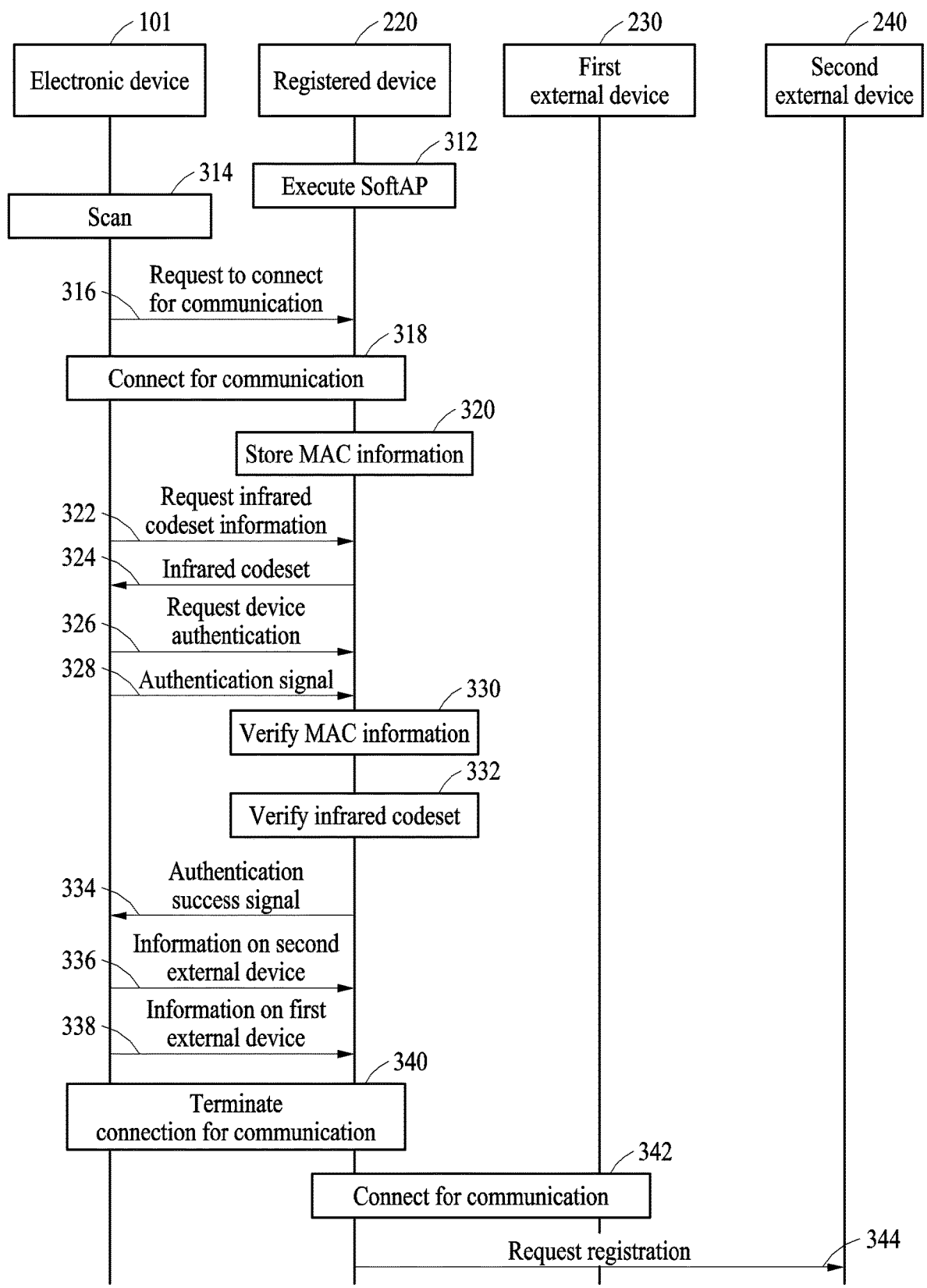
FIG. 3 is a diagram illustrating a successful process of device authentication in a system according to an example embodiment.

FIG. 3 is a diagram illustrating a successful process of device authentication in a system according to an example embodiment.

Referring to FIG. 3, in operation 312, the registered device 220 may activate a communication connection standby state.

When the electronic device 101 finds the registered device 220 in the communication connection standby state through a scan in operation 314, the electronic device 101 may request the registered device 220 to connect for communication, based on identification information of the registered device 220 and a preset password in operation 314 and may connect for communication with the registered device 220 in operation 318.

When the registered device 220 in the communication connection standby state receives the request to connect for communication from the electronic device 101 in operation 316, the registered device 220 in the communication connection standby state may connect for communication by receiving the preset password in operation 318. In this case, communication may be Wi-Fi communication. In addition, communication may be one of Bluetooth communication, BLE communication, and ZigBee communication.

The registered device 220 may store MAC information of the electronic device 101.

When connected for communication in operation 318, the electronic device 101 may request the registered device 220 for infrared codeset information through the connection for communication in operation 322. In this case, the infrared codeset information may be information corresponding to a button, for authentication, of the registered device 220.

When receiving the request for the infrared codeset information from the electronic device 101 through the connection for communication in operation 322, the registered device 220 may transmit the infrared codeset information to the electronic device 101 through the connection for communication in operation 324.

When receiving the infrared codeset information from the registered device 220 through the connection for communication in operation 324, the electronic device 101 may request the registered device 220 for device authentication through the connection for communication in operation 326 and transmit an authentication signal including the infrared codeset information to the registered device 220 over infrared light in operation 328. In this case, the authentication signal may include information on a preset region of MAC of the electronic device 101 such that the registered device 220 may verify the electronic device 101, infrared-type information indicating that the authentication signal is an infrared signal for device authentication, and the infrared codeset information. In this case, the preset region of MAC may be information corresponding to the last 2 bytes of a MAC address.

When receiving the authentication signal over infrared light in operation 328, the registered device 220 may compare, to information on a preset region of MAC of the electronic device 101 included in the authentication signal, MAC information of the electronic device 101 that is stored when connecting for communication and may verify whether the authentication signal is received from the electronic device 101 in operation 330.

When receiving the authentication signal from the electronic device 101, that is, when the authentication signal is an authentication signal received from a legitimate electronic device 101, the registered device 220 may verify whether the authentication signal is transmitted for device authentication by verifying infrared-type information, and when the infrared-type information is for device authentication, may perform device authentication by performing an input to a button, for authentication, of the registered device 220 corresponding to the infrared codeset information in operation 332.

When device authentication succeeds after the registered device 220 performs the device authentication by using the authentication signal, the registered device 220 may transmit a signal corresponding to the success of device authentication to the electronic device 101 in operation 334.

When the electronic device 101 receives the signal corresponding to the success of device authentication from the registered device 220 through the connection for communication in operation 334, the electronic device 101 may transmit information needed for registration in the second external device 240 to the registered device 220 through the connection for communication in operation 336.

The electronic device 101 may transmit, to the registered device 220 through communication, information needed for connection to the first external device 230 in operation 338.

The electronic device 101 may disconnect communication with the registered device 220 in operation 340.

When the registered device 220 receives, from the electronic device 101, information needed for registration in the second external device 240 and information needed for connection to the first external device 230, the registered device 220 may connect to the first external device 230 by using the information needed for connection to the first external device 230 in operation 342.

The registered device 220 may use the information needed for registration in the second external device 240 and may register in the second external device 240 through the first external device 230 in operation 344.

Although the electronic device 101 terminates connection for communication with the registered device 220 in operation 340 in FIG. 3, operation 340 may be performed after operation 342 in another example embodiment. In other words, after the electronic device 101 detects that the registered device 220 connects for communication with the first external device in operation 342, the electronic device 101 may disconnect communication with the registered device 220. In another example embodiment, without performing operation 340, the electronic device 101 may maintain connection for communication with the registered device 220.

Figure 4:
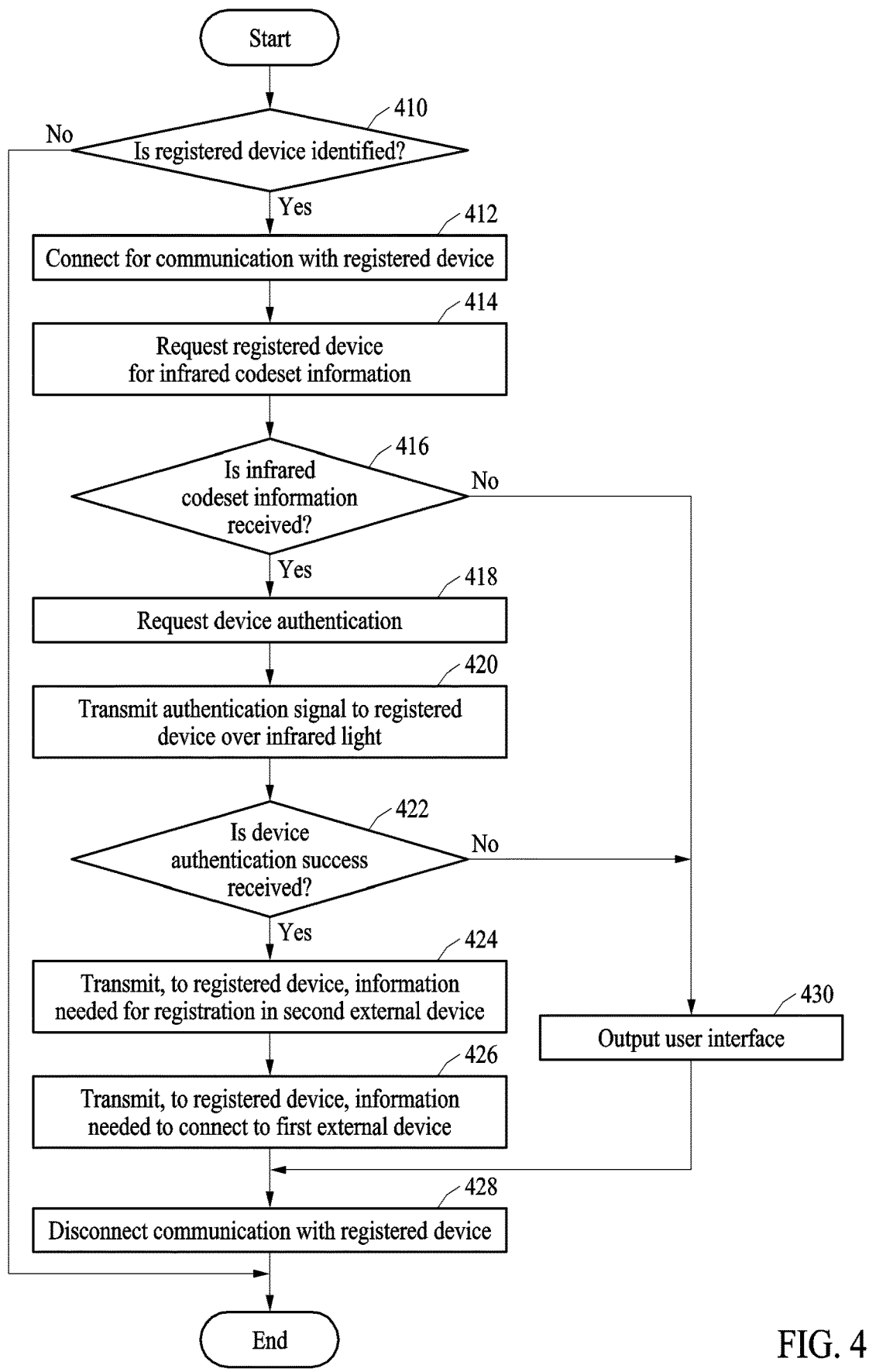
FIG. 4 is a flowchart illustrating performing device authentication of a registered device over infrared light by an electronic device according to an example embodiment.

FIG. 4 is a flowchart illustrating performing device authentication of a registered device over infrared light by an electronic device according to an example embodiment.

Referring to FIG. 4, the electronic device 101 may identify, through a scan, the registered device 220 in a communication connection standby state in operation 410.

When the registered device 220 is identified after operation 410, the electronic device 101 may connect for communication based on identification information of the registered device 220 and a preset password in operation 412. In this case, the communication may be Wi-Fi communication. In addition, the communication may be one of Bluetooth communication, BLE communication, and ZigBee communication.

The electronic device 101, through the communication connected to the registered device 220, may request infrared codeset information in operation 414. In this case, the infrared codeset information may be information corresponding to a button, for authentication, of the registered device 220.

When the electronic device 101 receives the infrared codeset information from the registered device 220 through the connection for communication in operation 316, the electronic device 101 may request the registered device 220 for device authentication through the connection for communication in operation 418.

Then, the electronic device 101 may transmit an authentication signal including the infrared codeset information to the registered device 220 over infrared light in operation 420. In this case, the authentication signal may include information on a preset region of MAC of the electronic device 101 such that the registered device 220 may verify the electronic device 101, infrared-type information indicating that the authentication signal is an infrared signal for device authentication, and the infrared codeset information.

When the electronic device 101 receives the signal corresponding to device authentication success from the registered device 220 through the connection for communication in operation 422, the electronic device 101 may transmit information needed for registration in the second external device 240 to the registered device 220 through the connection for communication in operation 424.

The electronic device 101 may transmit, to the registered device 220 through the connection for communication, information needed for connection to the first external device 230 in operation 426.

The electronic device 101 may disconnect communication with the registered device 220 in operation 428.

In this case, when the electronic device 101 disconnects communication with the first external device 230 to connect for communication with the registered device 220, after operation 428, the electronic device 101 may reconnect for communication with the first external device 230.

In addition, when the infrared codeset information is not received after operation 416 or when the device authentication fails after operation 422, the electronic device 101 may output, on a screen, a user interface via which a user may perform a device authentication process manually. In this case, when receiving a signal notifying that the device authentication fails from the registered device 220 through the connection for communication or when not receiving any response from the registered device 220 for a preset time, the electronic device 101 may determine that the device authentication fails.

Figure 5:
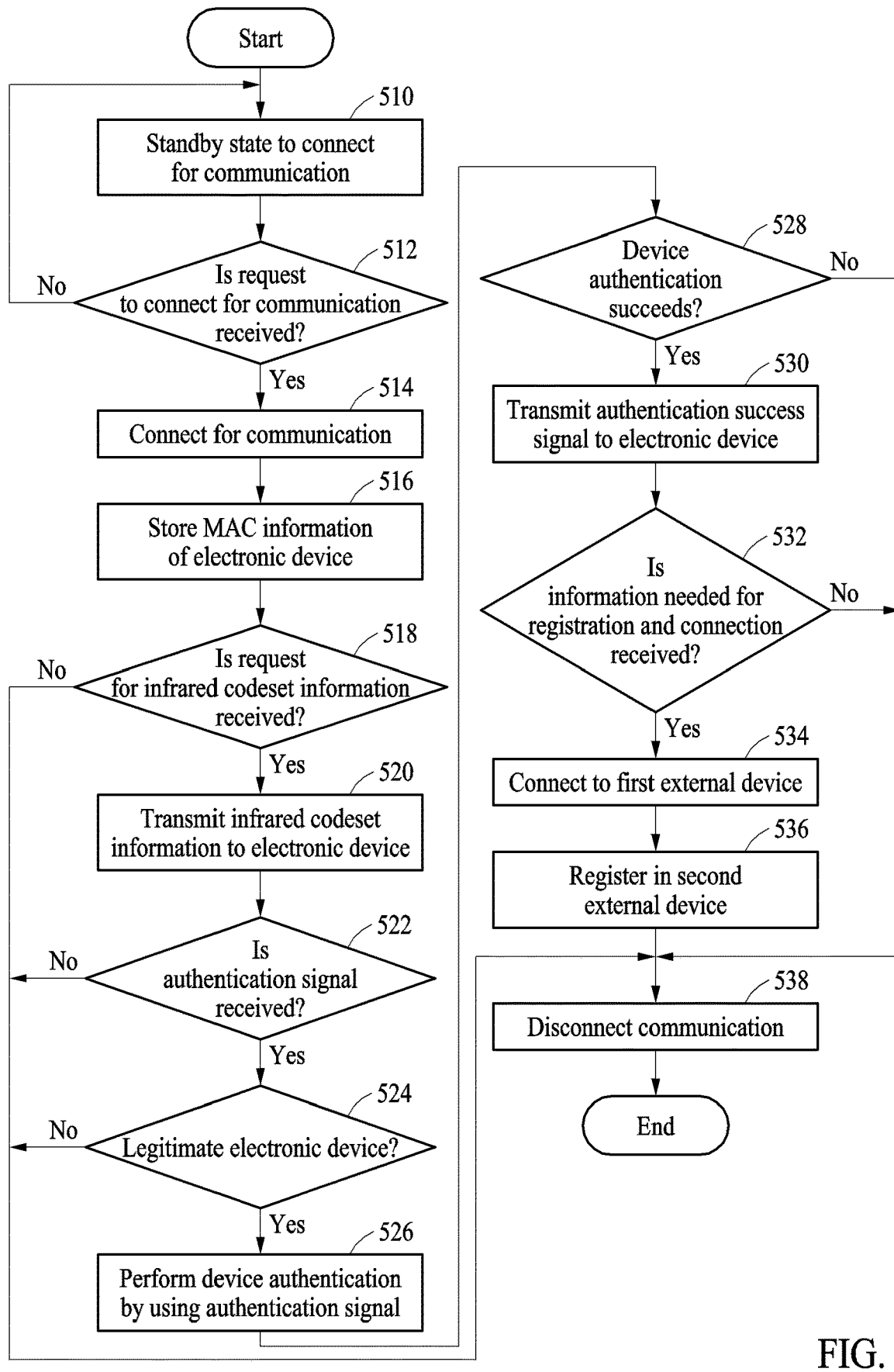
FIG. 5 is a flowchart illustrating performing device authentication over infrared light by a registered device according to an example embodiment.

FIG. 5 is a flowchart illustrating performing device authentication over infrared light by a registered device according to an example embodiment.

Referring to FIG. 5, a registered device 220 may activate a communication connection standby state for device authentication upon the request from a user in operation 510. In this case, in operation 510, the registered device 220 may activate a SoftAP to activate the communication connection standby state. Although the SoftAP is a wireless LAN client, a function as an access point (AP) is implemented as software, which allows the SoftAP to operate as a wireless AP.

In addition, when the registered device 220 in the communication connect standby state receives a request to connect for communication from the electronic device 101 in operation 512, the registered device 220 may connect for communication by receiving a preset password in operation 514. The communication may be Wi-Fi communication. In addition, the communication may be one of Bluetooth communication, BLE communication, and ZigBee communication.

The registered device 220 may store MAC information of the electronic device 101 in operation 516.

When the registered device 220 receives a request for infrared codeset information from the electronic device 101 through the connection for communication in operation 518, the registered device 220 may transmit the infrared codeset information to the electronic device 101 through the connection for communication in operation 520. In this case, the infrared codeset information may be information corresponding to a button, for authentication, of the registered device 220.

When the registered device 220 receives an authentication signal over infrared light in operation 522, the registered device 220 may verify whether a device that has transmitted the authentication signal is a legitimate electronic device 101 in operation 524. In other words, the registered device 220 may verify that the authentication signal is transmitted from the electronic device 101 connected thereto for communication in operation 524.

In this case, the authentication signal may include information on a preset region of MAC of the electronic device 101 such that the registered device 220 may verify the electronic device 101, infrared-type information indicating that the authentication signal is an infrared signal for device authentication, and the infrared codeset information.

In operation 524, the registered device 220 may compare, to information on a preset region of the MAC of the electronic device 101 included in the authentication signal, the MAC information of the electronic device 101 that is stored when connecting for communication and may verify that the authentication signal is from the electronic device 101.

When the device that has transmitted the authentication signal is the legitimate electronic device 101 after operation 524, the registered device 220 may perform device authentication by using the authentication signal in operation 526. More specifically, the registered device 220 may verify infrared-type information included in the authentication signal and verify the authentication signal is transmitted for device authentication, and when the infrared-type information is for device authentication, may perform an input to the button, for authentication, of the registered device 220, corresponding to infrared codeset information included in the authentication signal and perform device authentication.

When the device authentication succeeds after the registered device 220 performs the device authentication by using the authentication signal in operation 528, the registered device 220 may transmit a signal corresponding to device authentication success to the electronic device 101.

When the registered device 220 receives, from the electronic device 101, information needed for registration in the second external device 240 and information needed for connection to the first external device 230 in operation 532, the registered device 220 may connect to the first external device 230 by using the information needed for connection to the first external device 230 and may be registered, through the first external device 230, in the second external device 240 by using the information needed for registration in the second external device 240. In operation 538, the registered device 220 may disconnect communication with the electronic device 101. For example, when the request for infrared codeset information is not received after operation 518, when the authentication signal over infrared light is not received after operation 522, when the device transmitting the authentication signal is not a legitimate electronic device 101 after operation 524, when the device authentication fails after operation 528, or when the information needed for registration in the second external device 240 and the information needed for connection to the first external device 230 are not received after operation 532, the registered device 220 may disconnect communication with the electronic device 101 in operation 538.

In addition, when the registered device 220 fails to connect to the first external device 230 in operation 534, the registered device 220 may transmit the failure of connecting to the first external device 230 to the electronic device 101, and the electronic device 101 may output a user interface on a screen and may guide a user to set up connection to the first external device 230.

When not receiving the information needed for registration in the second external device 240 and the information needed for connection to the first external device 230 after operation 532, the registered device 220 may perform operation 538 or may request the electronic device 101 to retransmit the information needed for registration in the second external device 240 and the information needed for connection to the first external device 230.

Although not shown in FIG. 5, when failing to connect to the first external device 230 or failing to register in the second external device 240 because the information needed for registration in the second external device 240 and the information needed for connection to the first external device 230 are inaccurate, the registered device 220 may provide information on the failure to the electronic device 101, the electronic device 101 may notify a user of the failure through a user interface, and the user may solve the problem.

Figure 6A:
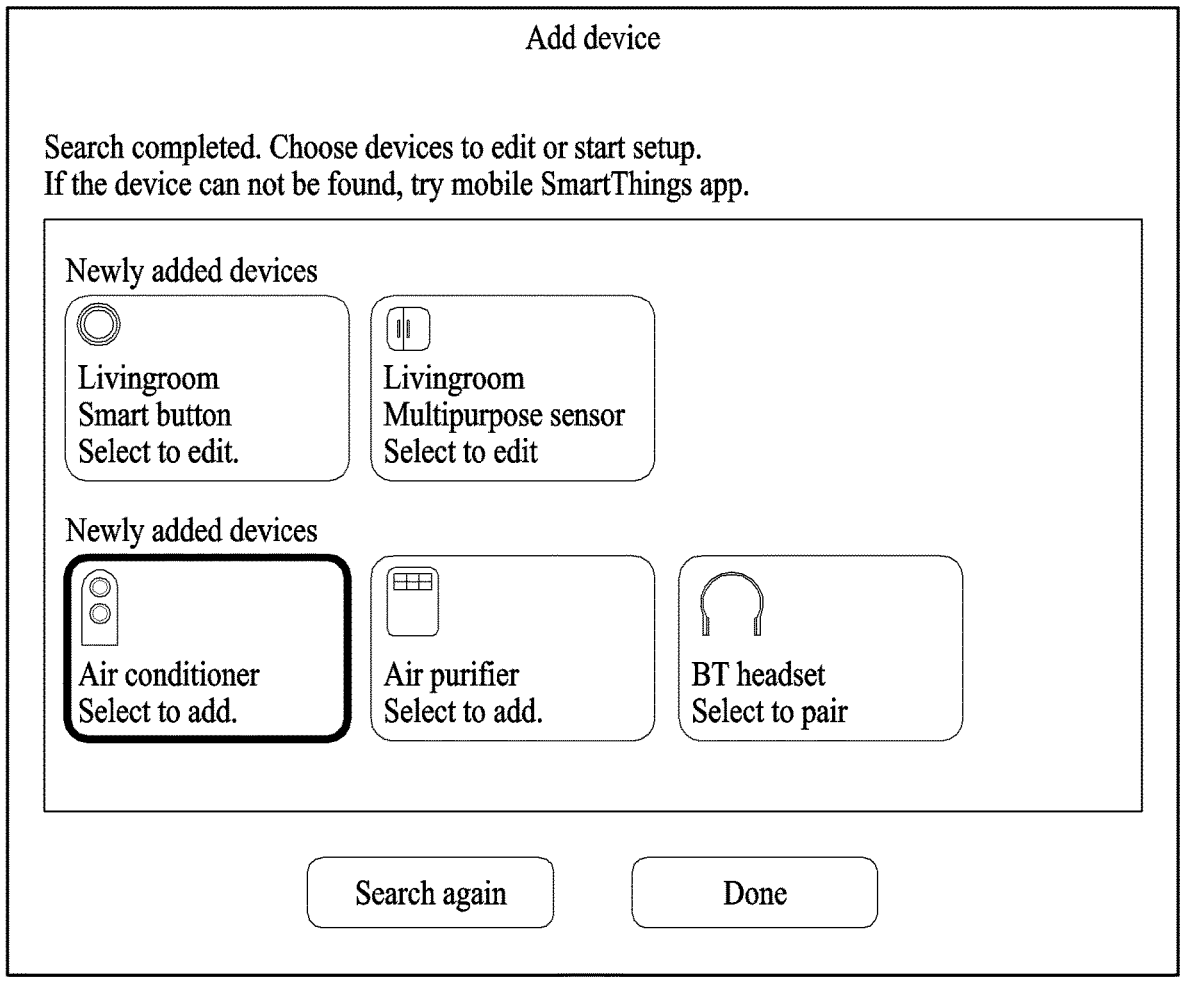
FIG. 6A is a diagram illustrating a user interface screen when selecting a device to be registered among devices identified by an electronic device according to an example embodiment.

FIG. 6A is a diagram illustrating a user interface screen when selecting a device to be registered among devices identified by an electronic device according to an example embodiment.

Referring to FIG. 6A, the diagram illustrates a screen that is output as a result of operation 314 described with reference to FIG. 3, and the screen displays registered devices that are identified through a scan by the electronic device 101.

Figure 6B:
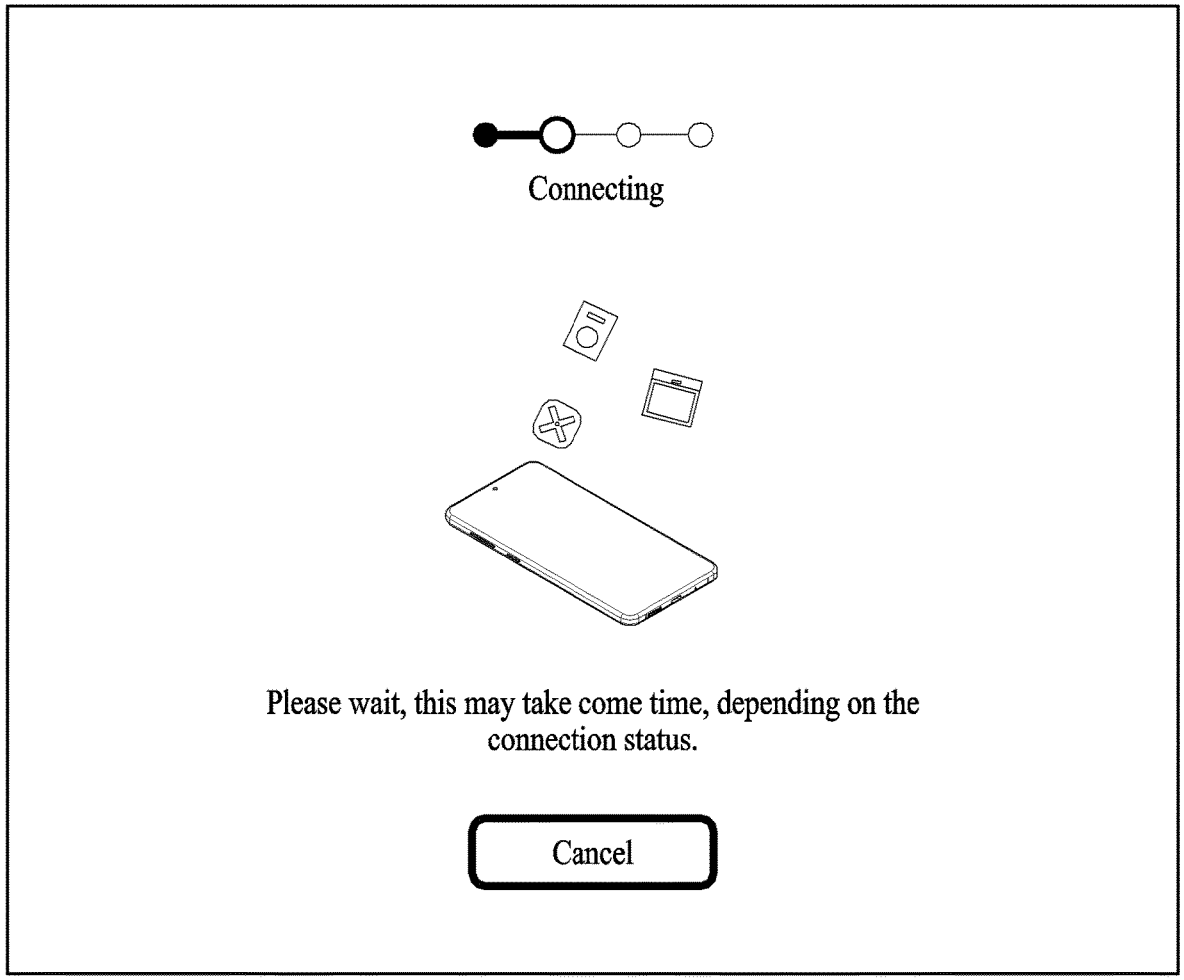
FIG. 6B is a diagram illustrating a screen output during a process of connecting a selected registered device by an electronic device according to an example embodiment.

FIG. 6B is a diagram illustrating a screen output during a process of connecting a selected registered device by an electronic device according to an example embodiment.

Referring to FIG. 6B, the diagram illustrates a screen that is output during operations 316 to 318 described with reference to FIG. 3.

With a user selecting an air conditioner from among identified registered devices, the electronic device 101 may output the screen of FIG. 6B when the electronic device 101 connects for communication, based on identification information of the air conditioner and a preset password.

Figure 6C:
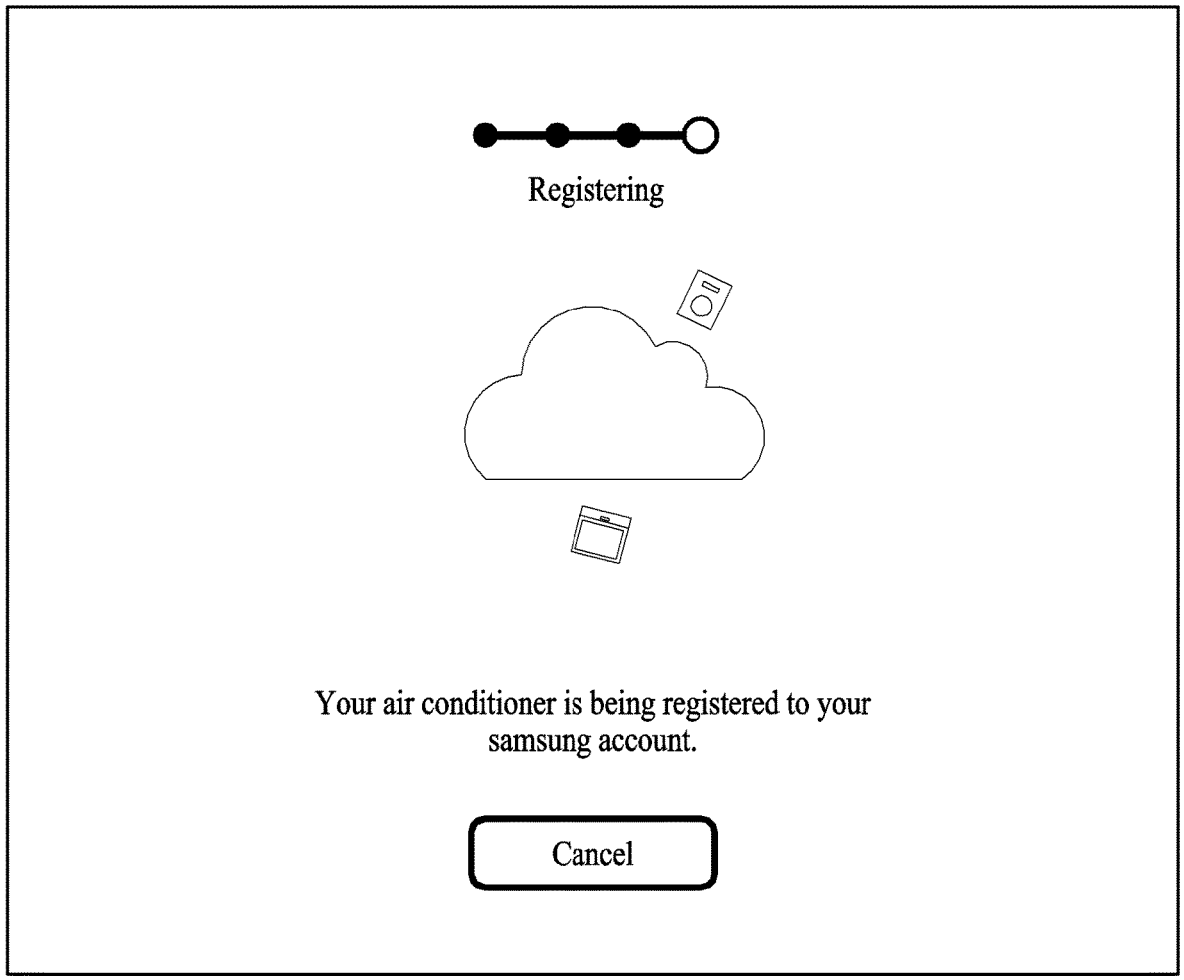
FIG. 6C is a diagram illustrating a screen output when a selected registered device is registered in an Internet of Things (IoT) cloud by an electronic device according to an example embodiment.

FIG. 6C is a diagram illustrating a screen output when a selected registered device is registered in an IoT cloud by an electronic device according to an example embodiment.

Referring to FIG. 6C, the diagram illustrates a screen that is output during operations 320 to 344 until the selected registered device is registered in the IoT cloud.

In the prior arts, a screen may output a user interface that instructs a user to approach an air conditioner, which is the selected registered device, and press a power button of the air conditioner between FIGS. 6B and 6C, that is, to proceed to the next step, which is FIG. 6C, the user may need to press the power button of the air conditioner.

However, in the present disclosure, by using an infrared signal, an operation of the user directly pressing the power button of the air conditioner may be omitted.

Accordingly, the electronic device 101 may register the air conditioner in the IoT cloud without the user's intervention.

Figure 6D:
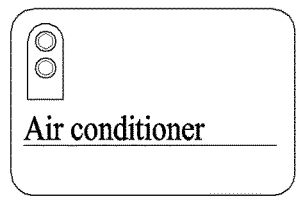
FIG. 6D is a diagram illustrating a user interface screen for classifying and managing a registered device registered in an IoT cloud by an electronic device according to an example embodiment.

FIG. 6D is a diagram illustrating a user interface screen for classifying and managing a registered device registered in an IoT cloud by an electronic device according to an example embodiment.

Referring to FIG. 6D, the electronic device 101 may output the user interface screen for classifying an air conditioner registered in the IoT cloud.

Referring to FIG. 6D, the electronic device 101 may classify the air conditioner into a living room and manage the classified air conditioner in a management box.

Figure 6E:
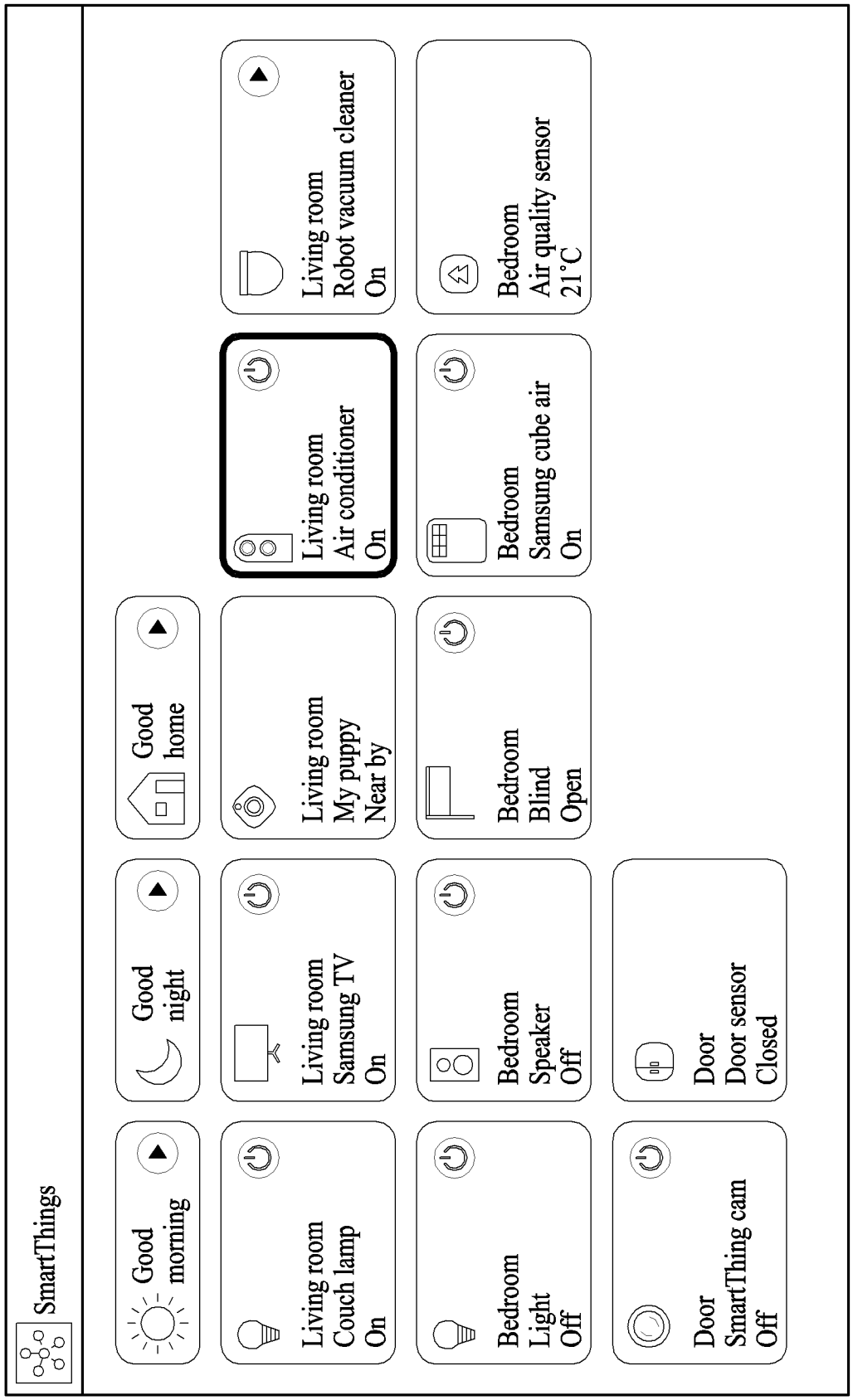
FIG. 6E is a diagram illustrating a user interface screen for controlling a registered device registered in an IoT cloud by an electronic device according to an example embodiment.

FIG. 6E is a diagram illustrating a user interface screen for controlling a registered device registered in an IoT cloud by an electronic device according to an example embodiment.

Referring to FIG. 6E, an air conditioner may be included in a list of registered devices.

In addition, the electronic device 101 may output all the registered devices in the IoT cloud in the list and a user may check the current state of the registered devices therein.

Hereinafter, an electronic device and a registered device configuring a method as described above are described with reference to the drawings.

Figure 7:
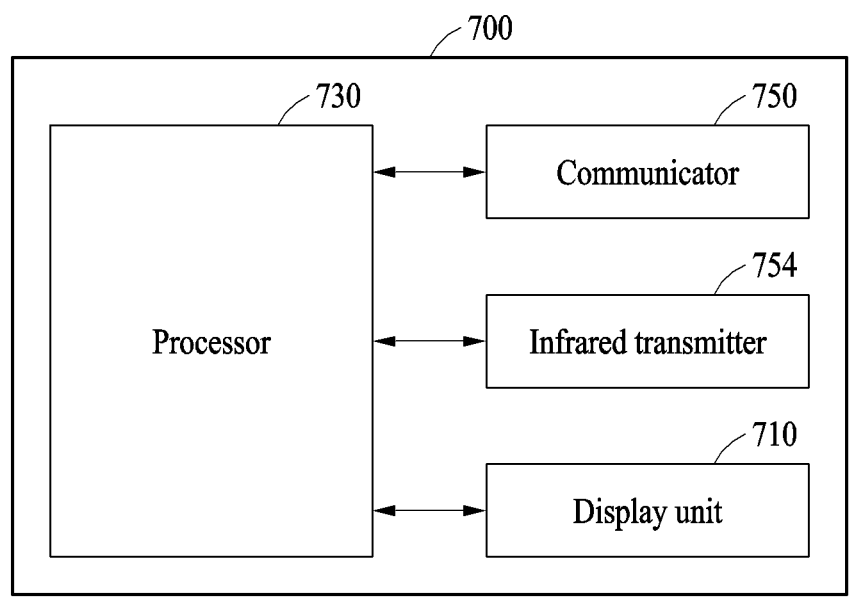
FIG. 7 is a block diagram illustrating an electronic device according to an example embodiment.
Figure 8:
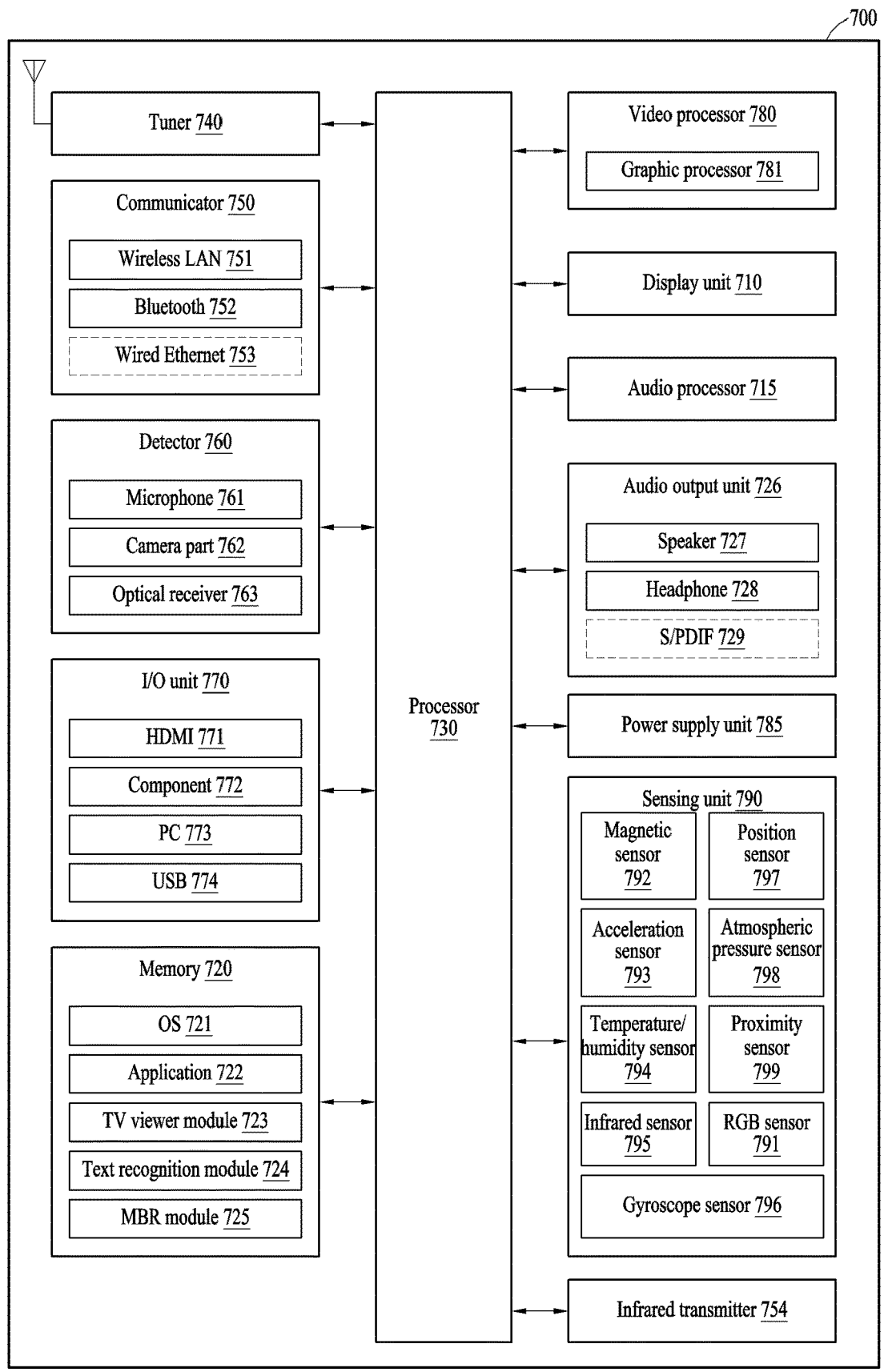
FIG. 8 is a detailed block diagram illustrating an electronic device according to an example embodiment.

FIG. 7 is a block diagram illustrating an electronic device according to an example embodiment. FIG. 8 is a detailed block diagram illustrating an electronic device according to an example embodiment.

As illustrated in FIG. 7, an electronic device 700 may include a display unit 710, a processor 730, a communicator 750, and an infrared transmitter 754. However, not all the illustrated components are essential. The electronic device 700 may be implemented by more or less components than the illustrated components. In this case, the electronic device 700 may be a display device, such as a TV.

For example, as illustrated in FIG. 8, other than the display unit 710, the processor 730, the communicator 750, and the infrared transmitter 754, the electronic device 700 may further include a memory 720, a tuner 740, a detector 760, an input/output (I/O) unit 770, a video processor 780, an audio processor 715, an audio output unit 726, a power supply unit 785, and a sensing unit 790.

Hereinafter, the components stated above are described.

The communicator 750, through a scan, may search for the registered device 220 and may connect for communication with the registered device 220. The display unit 710 may output, on a screen, a user interface via which a user performs device authentication. A detailed description on the communicator 750 and the display unit 710 are provided below.

The infrared transmitter 754 may transmit an infrared signal under control by the processor 730.

When the registered device 220 is identified by the communicator 750, the processor 730 may control the electronic device 700 to connect for communication based on identification information of the registered device 220 and a preset password, control the electronic device 700 to request the registered device 220 for infrared codeset information through the connection for communication, when the infrared codeset information is received from the registered device 220, control the electronic device 700 to request the registered device 220 for device authentication through the connection for communication, and control the electronic device 700 to transmit, to the registered device 220, an authentication signal including the infrared codeset information over infrared light.

In this case, the communication may be Wi-Fi communication. In addition, the communication may be one of Bluetooth communication, BLE communication, and ZigBee communication. The infrared codeset information may be information corresponding to a button, for authentication, of the registered device 220. The authentication signal may include information on a preset region of MAC of the electronic device 700 such that the registered device 220 may verify the electronic device 700, infrared-type information indicating that the authentication signal is an infrared signal for device authentication, and the infrared codeset information. In this case, the preset region of MAC may be information corresponding to the last 2 bytes of a MAC address.

In response to receiving a signal corresponding to device authentication success from the registered device 220 through the connection for communication, the processor 730 may control the electronic device 700 to transmit information needed for registration in the second external device 240 to the registered device 220 through the connection for communication and transmit, to the registered device 220 through communication, information needed for connection to the first external device 230.

The processor 730, when transmitting, to the registered device 220, the information needed for registration in the second external device 240 and the information needed for connection to the first external device 230, may control the electronic device 700 to terminate the connection for communication with the registered device 220.

The processor 730, when determining that the device authentication fails, may control the electronic device 700 to output a user interface, through the display unit 710, via which a user may perform a device authentication process.

In this case, when receiving an authentication failure signal notifying that device authentication fails from the registered device 220 through communication or when not receiving any response from the registered device 220 for a preset time, the processor 730 may determine that device authentication fails.

In addition, the processor 730 may include random access memory (RAM) configured to store data or a signal input from the outside of the electronic device 700 or configured to be used as a storage corresponding to various tasks performed by the electronic device 700, read-only memory (ROM) that stores a control program to control the electronic device 700, and a processor.

The processor 730 may include a GPU (not shown) to process a graphic corresponding to a video. The processor 730 may be implemented as a System on Chip (SoC) that integrates a core (not shown) with a GPU (not shown). The processor 730 may include a single core, a dual core, a triple core, a quad core, and a multi core.

The processor 730 may include a plurality of processors. For example, the processor 730 may be implemented as a main processor (not shown) and a sub-processor (not shown) that operates in a sleep mode.

The processor 730 may detect at least one sensed value corresponding to at least one sensor through the sensing unit 790 including at least one sensor, by executing one or more instructions stored in the memory 720.

The processor 730, by executing one or more instructions stored in the memory 720, when the detected at least one sensed value is greater than or equal to a preset threshold, may determine that a remote control device (e.g., a remote controller) touches the electronic device 700.

The processor 730, by executing one or more instructions stored in the memory 720, and by comparing the detected at least one sensed value with a sensed value of the remote control device, received from the remote control device (not shown), may determine that the remote control device has touched the electronic device 700.

The processor 730, by executing one or more instructions stored in the memory 720, may request identification information of the remote control device and receive the identification information of the remote control device. The processor 730, based on the identification information of the remote control device, may verify that the remote control device is a device preregistered in the electronic device 700.

The processor 730, by executing one or more instructions stored in the memory 720, based on one or more sensed values, may determine a touched region in which the remote control device touches the electronic device 700.

The processor 730, by executing one or more instructions stored in the memory 720, may compare at least one sensed value detected corresponding to the at least one sensed value to one another, and based on a comparison result, may determine one or more sensors that are determined to be proximate to a point where the remote control device touches the electronic device 700. The processor 730, based on the determined one or more sensors, may determine a touch region.

The processor 730, through the communicator 750, may receive, from the remote control device, state information on an operation being executed by the remote control device.

The processor 730, by executing one or more instructions stored in the memory 720, based on the state information received from the remote control device, may perform a preset function corresponding to the determined touch region.

The processor 730, by executing one or more instructions stored in the memory 720, based on one or more sensed values, may determine the number of touches the remote control device performs on the electronic device 700.

The processor 730, by executing one or more instructions stored in the memory 720, may perform a preset function corresponding to the number of touches.

The processor 730, by executing one or more instructions stored in the memory 720, based on a user's input, may preset a function corresponding to at least one touch region on the electronic device 700.

The processor 730, by executing one or more instructions stored in the memory 720, based on the user's input, may preset a function corresponding to the number of touches performed on at least one touch region on the electronic device 700.

The memory 720 may store various pieces of data, a program, or an application for driving and controlling the electronic device 700 under control by the processor 730. The memory 720 may store an I/O signal or data corresponding to the driving of the video processor 780, the display unit 710, the audio processor 715, the audio output unit 726, the power supply unit 785, the tuner 740, the communicator 750, the detector 760, and the I/O unit 770. The memory 720 may store a game list including game title images, which is the list of games a user has played.

The memory 720 may store an operating system 721 for controlling the electronic device 700 and the processor 730, an application 722 initially provided by a manufacturer or externally downloaded, a graphical user interface (GUI) related to the application 722, an object (e.g., image text, an icon, a button, etc.) for providing the GUI, user information, a document, a database, and relevant data.

In addition, the memory 720 may include a TV viewer module 723 including one or more instructions to receive an input signal from a remote control device and perform channel control corresponding to the input signal, or enter a channel scroll user interface mode when the input signal corresponds to a preset input, a text recognition module 724 including one or more instructions to recognize information from content received from an external device (not shown), and a membrane bioreactor (MBR) module 725 including one or more instructions to control a channel from an external device (not shown).

The memory 720 may include ROM, RAM, a memory card (e.g., a micro SD card and a USB memory, which are not shown) mounted to the electronic device 700. In addition, the memory 720 may include non-volatile memory, volatile memory, a hard disk drive (HDD), or a solid state drive (SSD).

The memory 720 may include at least one type of a storage medium among a flash memory type, a hard disk type, a multimedia card micro type, a card memory type (e.g., SD or extreme digital (XE) memory), RAM, static RAM (SRAM), ROM, electrically erasable programmable ROM (EEPROM), programmable ROM (PROM), magnetic memory, a magnetic disk, and an optical disk).

The display unit 710 may display a video included in a broadcast signal received through the tuner 740 on a screen under control by the processor 730. In addition, the display unit 710 may display content (e.g., a moving image) input through the communicator 750 or the I/O unit 770. The display unit 710 may output an image stored in the memory 720 under control by the processor 730.

The display unit 710, under control by the processor 730, may display, on a screen, a menu screen of the electronic device 700 and a game menu screen of a game console. The display unit 710 may generate a driving signal by converting an image signal, a data signal, an on-screen display (OSD) signal, and a control signal processed by the processor 730. The display unit 710 may be implemented as a plasma display panel (PDP), a liquid crystal display (LCD), an organic light-emitting diode (OLED) display, a cathode ray tube (CRT) display, and a flexible display, and in addition, the display 230 may be implemented as a three-dimensional (3D) display. In addition, the display unit 710 may be used both as an input device and an output device by being configured as a touchscreen.

The tuner 740 may tune and select the frequency of a channel desired to be received by the electronic device 700 from among various radio wave elements by amplifying, mixing, and resonating a broadcast signal received by wire or wirelessly. The broadcast signal may include audio, video, and additional information (e.g., an electronic program guide (EPG)).

The tuner 740 may receive the broadcast signal from a frequency band corresponding to a channel number according to a user's input (e.g., a control signal received from a remote control device (not shown), that is, a channel number input, an up-down channel input, and a channel input on an EPG screen).

The tuner 740 may receive broadcast signals from various sources, such as terrestrial broadcast, cable broadcast, satellite broadcast, and Internet broadcast. The tuner 740 may receive the broadcast signal from a source, such as analog broadcast or digital broadcast. The broadcast signal received by the tuner 740 may be decoded (e.g., audio decoding, video decoding, or additional information decoding) and separated into audio, video, and/or additional information. The separated audio, video, and/or additional information may be stored in the memory 720 under control by the processor 730.

One or a plurality of tuners 740 of the electronic device 700 may be provided. The tuner 740 may be implemented as all-in-one with the electronic device 700 or implemented as a separate device (e.g., a set-top box, which is not shown, and a tuner, which is not shown, connected to the I/O unit 770) that includes a tuner electrically connected to the electronic device 700.

The communicator 750 may connect the electronic device 700 to an external device (e.g., an audio device) (not shown) under control by the processor 730. The processor 730 may transmit/receive content to/from the external device (not shown) connected through the communicator 750, may download an application from the external device (not shown), or may perform web browsing. The communicator 750 may include one of a wireless LAN 751, Bluetooth 752, and wired Ethernet 753 depending on the performance and the structure of the electronic device 700. In addition, the communicator 750 may include a combination of the wireless LAN 751, the Bluetooth 752, and the wired Ethernet 753.

In addition, the communicator 750, when searching for the registered device 220 and connecting for communication by using the identification information of the registered device 220 and a preset password, may connect for communication by using a communication technique selected, under control by the processor 730, from among communication techniques included by the communicator 750. Accordingly, the communication technique that is used by the communicator 750 to connect for communication with the registered device 220 may be one of Bluetooth, BLE (not shown), and ZigBee (not shown).

In addition, the communicator 750 may further include another local area communication (e.g., near field communication (NFC), which is not shown) other than Bluetooth, BLE (not shown), and ZigBee (not shown).

The detector 760 may detect voice, an image, or an interaction of a user and may include a microphone 761, a camera part 762, and an optical receiver 763.

The microphone 761 may receive the user's voice. The microphone 761 may convert the received voice into an electrical signal and output the electrical signal to the processor 730. The user's voice may include, for example, voice corresponding to a menu or a function of the electronic device 700.

The processor 730 may receive the user's voice through the microphone 761 in the electronic device 700 and receive data corresponding to the user's voice through a remote control device (e.g., a remote controller). For example, the user's voice may be received by a microphone in the remote control device, and the remote control device may transmit a signal corresponding to the user's voice to the electronic device 700.

As another example, an application and/or a program for receiving the user's voice or controlling the electronic device 700 may be installed in an external electronic device, and the processor 730 may receive data corresponding to the user's voice through the external electronic device (e.g., an AI speaker).

The camera part 762 may obtain an image bezel, such as a still image or a moving image. An image captured by an image sensor may be processed by the processor 730 or a separate image processor (not shown).

The image bezel processed by the camera part 762 may be stored in the memory 720 or may be transmitted to an external electronic device through the communicator 750. Two or more camera parts 762 may be provided depending on a configuration of the electronic device 700.

The optical receiver 763 may receive an optical signal (including a control signal) received from an external remote control device (not shown). The optical receiver 763 may receive an optical signal corresponding to a user's input (e.g., a touch, a press, a touch gesture, voice, or a motion) from a remote control device. A control signal may be extracted from the received optical signal under control by the processor 730. For example, the optical receiver 763 may receive, from the remote control device, a control signal corresponding to a channel up/down button for changing a channel.

The I/O unit 770 may receive a video (e.g., a moving image, etc.), audio (e.g., voice, music, etc.), and additional information (e.g., an EPG, etc.) from the outside of the electronic device 700 under control by the processor 730. The I/O unit 770 may include at least one of a high-definition multimedia interface (HDMI) port 771, a component jack 772, a PC port 773, and a USB port 774. The I/O unit 770 may include any combination of the HDMI port 771, the component jack 772, the PC port 773, and the USB port 774. An external image-providing device (not shown) may be connected through the game console or the HDMI port 771. However, a port of the I/O unit 770 may be implemented as various ports. For example, the HDMI port 771 may simultaneously transmit a video/audio signal, but instead of the HDMI port 771, the I/O unit 770 may include a port for inputting/outputting a video signal and an audio signal separately. As another example, the electronic device 700 may transmit the video/audio signal to an external device (not shown), not to the display unit 710, and the I/O unit 770 may include various interfaces for transmitting/receiving the video/audio signal to/from the external device by wire or wirelessly.

The video processor 780 may process video data received by the electronic device 700. The video processor 780 may perform various image processing on video data, such as decoding, scaling, noise filtering, bezel rate conversion, and resolution conversion.

A graphic processor 781 may generate a screen including various objects, such as an icon, an image, and text, by using an arithmetic unit (not shown) and a renderer (not shown). The arithmetic unit (not shown) may calculate an attribute value, such as a color, a size, a shape, a coordinate value, to display each object based on a layout of a screen by using a user's input that is detected by the detector 760. The renderer (not shown) may generate screens in various layouts including an object, based on the attribute value calculated by the arithmetic unit (not shown). The screen generated by the renderer (not shown) may be displayed on a display area of the display unit 710.

The audio processor 715 may process audio data. The audio processor 715 may perform various processing on the audio data, such as decoding, amplification, and noise filtering. In addition, the audio processor 715 may include a plurality of audio processing modules to process audio corresponding to contents.

The audio output unit 726 may output audio included in the broadcast signal received through the tuner 740 under control by the processor 730. The audio output unit 726 may output audio (e.g., voice and sound) input through the communicator 750 or the I/O unit 770. In addition, the audio output unit 726 may output audio stored in the memory 720 under control by the processor 730. The audio output unit 726 may include at least one of a speaker 727, a headphones output terminal 728, and a Sony/Philips digital interface (S/PDIF) output terminal 729. The audio output unit 726 may include any combination of the speaker 727, the headphones output terminal 728, and the S/PDIF output terminal 729.

The power supply unit 785 may supply power input from an external power source to the components of the electronic device 700 under control by the processor 730. In addition, the power supply unit 785 may supply power output from one or more batteries (not shown) in the electronic device 700 to the components of the electronic device 700 under control by the processor 730.

The sensing unit 790 may sense a state of the electronic device 700 or a state surrounding the electronic device 700 and may provide the sensed information to the processor 730.

The sensing unit 790 may include at least one of a magnetic sensor 792, an acceleration sensor 793, a temperature/humidity sensor 794, an infrared sensor 795, a gyroscope sensor 796, a position sensor (e.g., global positioning system (GPS)) 797, an atmospheric pressure sensor 798, a proximity sensor 799, and a red, green, and blue (RGB) sensor 791 (e.g., an illuminance sensor), but examples are not limited to the foregoing examples. Since one skilled in the art may intuitively infer a function of each sensor from its name, a detailed description thereof is omitted.

The sensing unit 790 may sense an external impact on the electronic device 700. For example, when a remote control device touches the electronic device 700, the sensing unit 790 of the electronic device 700 may output a sensed value.

In addition, a separate external device (e.g., a set-top box, which is not shown) including the tuner 740 may be electrically connected to the electronic device 700 including the display unit 710.

In addition, the electronic device 700 may be implemented as an analog TV, a digital TV, a 3D-TV, a smart TV, an LED TV, an OLED TV, a plasma TV, and a monitor. However, one skilled in the art understands that the examples are not limited thereto.

The illustrated block diagram of the electronic device 700 is a block diagram of an example embodiment. Each component of the block diagram may be integrated, added, or omitted depending on actually implemented specifications of the electronic device 700. That is, two or more components may be combined into one component, or one component may be divided into two or more components, as necessary. In addition, a function performed by each block is for describing example embodiments, and a detailed operation thereof or a device does not limit the scope of the present disclosure.

Figure 9:
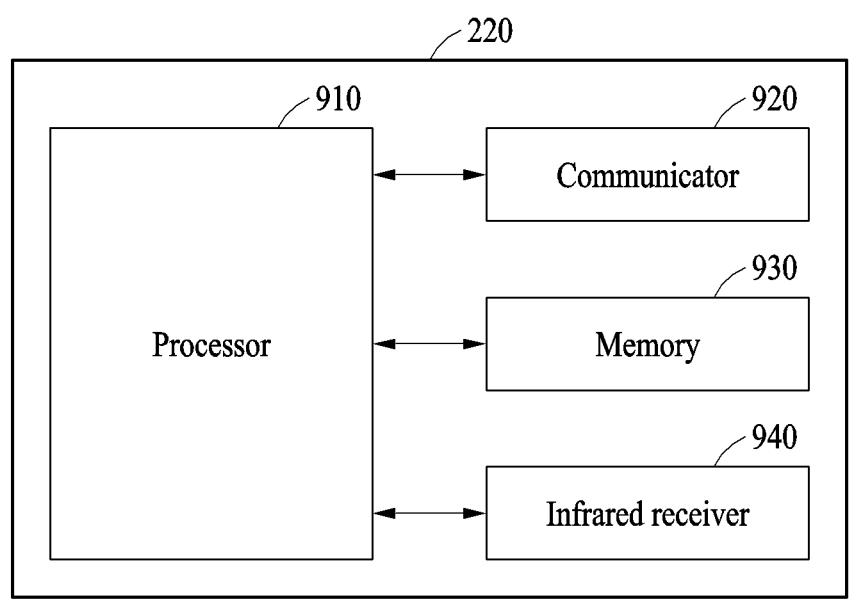
FIG. 9 is a block diagram illustrating a registered device according to an example embodiment.

FIG. 9 is a block diagram illustrating a registered device according to an example embodiment.

Referring to FIG. 9, the registered device 220 may include a processor 910, a communicator 920, a memory 930, and an infrared receiver 940.

When receiving a request to connect for communication from the electronic device 101, the communicator 920 may receive a preset password and connect for communication under control by the processor 910. In this case, the communication may be Wi-Fi communication. In addition, the communication may be one of Bluetooth communication, BLE communication, and ZigBee communication.

When the communicator 920 connects for communication, the memory 930 may store MAC information of the connected electronic device 101 under control by the processor 910. In this case, the MAC information may be a certain region of a MAC address that is needed for comparison.

The infrared receiver 940 may receive an authentication signal transmitted by the electronic device 101 over infrared light under control by the processor 910.

The processor 910, in a communication connection standby state through the communicator 920, when receiving a request to connect for communication from the electronic device 101, may receive a preset password and control the registered device 220 to connect for communication, control the registered device 220 to store the MAC information of the electronic device 101 in the memory 930, when receiving a request for infrared codeset information from the electronic device 101 through the communication, control the registered device 220 to transmit the infrared codeset information to the electronic device 101, and when receiving an authentication signal over infrared light, control the registered device 220 to perform device authentication by using the authentication signal. In this case, the infrared codeset information may be information corresponding to a button, for authentication, of the registered device 220. The authentication signal may include information on a preset region of MAC of the electronic device 101 such that the registered device 220 may verify the electronic device 101, infrared-type information indicating that the authentication signal is an infrared signal for device authentication, and the infrared codeset information. In this case, the preset region of MAC may be information corresponding to the last 2 bytes of a MAC address.

When performing device authentication by using the authentication signal, the processor 910 may compare, to the information on the preset region of MAC of the electronic device 101 included in the authentication signal, the MAC information of the electronic device 101 that is stored when connecting for communication and verify the authentication signal is received from the electronic device 101, when the authentication signal is received from the electronic device 101, may verify the infrared-type information and verify that the authentication signal is received for device authentication, and when the infrared-type information is for device authentication, may control the registered device 220 to perform device authentication by performing an input to a button, of the registered device 220, for authentication that corresponds to the infrared codeset information.

The processor 910 may control the registered device 220 to transmit a signal corresponding to device authentication success to the electronic device 101 after performing the device authentication through the authentication signal, and when receiving, from the electronic device 101, information needed for registration in the second external device 240 and information needed for connection to the first external device 230 through the connection for communication, connect to the first external device 230 by using the information needed for connection to the first external device 230, and to be registered in the second external device 240 through the first external device 230 by using the information needed for registration in the second external device 240.

The processor 910, after receiving the information needed for registration in the second external device 240 and the information needed for connection to the first external device 230, or after connecting to the first external device 230, may control the registered device 220 to terminate the connection for communication with the electronic device 101.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

Example embodiments of the disclosure may provide an electronic device and method of authenticating a registered device through infrared transmission, which may minimize a user's intervention by using infrared transmission when the electronic device authenticates the registered device.

What is claimed is:

1. A method performed by an electronic device, the method comprising:
  identifying a registered device through a scan;
  after identifying the registered device, connecting with the registered device based on identification information of the registered device and a preset password, to establish a communication connection with the registered device;
  requesting, through the established communication connection, infrared codeset information from the registered device; and
  after receiving the requested infrared codeset information from the registered device, transmitting, to the registered device through the established communication connection, a request for authentication of the registered device, and transmitting, to the registered device over infrared light, an authentication signal including the infrared codeset information, for authenticating the registered device.

2. The method of claim 1, further comprising:

in response to success in authenticating the registered device, receiving, from the registered device through the established communication connection, an authentication success signal;

after receiving the authentication success signal,
transmitting, to the registered device through the established communication connection, information needed for connection of the registered device to a first external device, and transmitting, through the established communication connection, information needed for registration of the registered device in a second external device.

3. The method of claim 2, further comprising:

after transmitting the information needed for connection of the registered device to the first external device and the information needed for registration of the registered device in the second external device, terminating the established communication connection with the registered device.

4. The method of claim 1, further comprising:

in response to failure in authenticating the registered device, controlling the electronic device to output, on a screen, a user interface via which authentication of the registered device is performable by a user.

5. The method of claim 4, further comprising:

in response to receiving, from the registered device through the established communication connection, an authentication failure signal, or when not receiving any response from the registered device for a preset time, determining that authentication of the registered device has failed.

6. The method of claim 1, wherein the established communication connection uses one of Wi-Fi communication, Bluetooth communication, Bluetooth low energy communication, and ZigBee communication.

7. The method of claim 1, wherein the infrared codeset information is information corresponding to a button, for authentication, of the registered device.

8. The method of claim 1, wherein the authentication signal further includes:

information of a preset region of media access control (MAC) of the electronic device, and infrared-type information indicating that the authentication signal is an infrared signal for device authentication.

9. A non-transitory computer-readable storage medium storing instructions that, when executed by a processor, cause the processor to perform the method of claim 1.

10. An electronic device comprising:

a memory storing instructions; and a processor that executes the instructions to perform a process including:

identifying a registered device through a scan, after identifying the registered device, connecting with the registered device based on identification information of the registered device and a preset password, to establish a communication connection with the registered device, requesting, through the established communication connection, infrared codeset information from the registered device, and after receiving the requested infrared codeset information from the registered device,
transmitting, to the registered device through the established communication connection, a request for authentication of the registered device, and transmitting, to the registered device over infrared light, an authentication signal including the infrared codeset information, for authenticating the registered device.

11. The electronic device of claim 10, wherein the process further includes:

in response to success in authenticating the registered device, receiving, from the registered device through the established communication connection, an authentication success signal, and after receiving the authentication success signal,
transmitting, to the registered device through the established communication connection, information needed for connection of the registered device to a first external device, and transmitting, through the established communication connection, information needed for registration of the registered device in a second external device.

12. The electronic device of claim 11, wherein the process further includes:

after transmitting the information needed for connection of the registered device to the first external device and the information needed for registration of the registered device in the second external device, terminating the established communication connection with the registered device.

13. The electronic device of claim 10, further comprising:

a display, wherein the process further includes:

in response to failure in authenticating the registered device, control the electronic device to display a user interface on the display through which authentication of the registered device is performable by a user.

14. The electronic device of claim 13, wherein the process further includes:

in response to receiving, from the registered device through the established communication connection, an authentication failure signal, or when not receiving any response from the registered device for a preset time, determining that authentication of the registered device has failed.

15. The electronic device of claim 10, wherein the established communication connection uses one of Wi-Fi communication, Bluetooth communication, Bluetooth low energy communication, and ZigBee communication.

16. The electronic device of claim 10, wherein the infrared codeset information comprises information corresponding to a button, for authentication, of the registered device.

17. The electronic device of claim 10, wherein the authentication signal further includes information of a preset region of media access control (MAC) information of the electronic device, and infrared-type information indicating that the authentication signal is an infrared signal for device authentication.

18. A system comprising:

an electronic device; and a registered device, wherein the electronic device is configured to perform a process including:

identifying the registered device through a scan, after identifying the registered device, connecting with the registered device based on identification information of the registered device and a preset password, to establish a communication connection with the registered device, requesting, through the established communication connection, infrared codeset information from the registered device, and after receiving the requested infrared codeset information from the registered device, transmitting, to the registered device through the established communication connection, a request for authentication of the registered device, and transmitting, to the registered device over infrared light, an authentication signal including the infrared codeset information, for authenticating the registered device, wherein the registered device is configured to perform a process including:

establishing the communication connection with the electronic device after receiving the preset password from the electronic device, storing media access control (MAC) information of the electronic device, after receiving, from the electronic device, the request for the infrared codeset information through the established communication connection, transmitting, to the electronic device, the infrared codeset information through the established communication connection in response to receiving the request for the infrared codeset information from the electronic device, and after receiving the authentication signal over infrared light, performing the authentication of the registered device by using the authentication signal.

19. The system of claim 18, wherein
the process which the electronic device is configured to perform further includes:

in response to success in authenticating the registered device, receiving, from the registered device through the established communication connection, an authentication success signal, after receiving the authentication success signal, transmitting, to the registered device through the established communication connection, information needed for connection of the registered device to a first external device, transmitting, through the established communication connection, information needed for registration of the registered device in a second external device, and terminating the established communication connection, and the process which the registered device is configured to perform includes:

when the authentication of the registered device succeeds after performing the authentication by using the authentication signal, transmitting, to the electronic device, the authentication success signal, when receiving, from the electronic device, the information needed for registration in the second external device and the information needed for connection to the first external device, connecting the registered device to the first external device by using the information needed for connection to the first external device and registering the registered device in the second external device by using the first external device.

20. The system of claim 18, wherein
the authentication signal further includes information on a preset region of the MAC of the electronic device, and infrared-type information indicating that the authentication signal is an infrared signal for device authentication, and
the process which the registered device is configured to perform further includes:

when performing the authentication by using the authentication signal, comparing the MAC information of the electronic device with the preset region of the MAC of the electronic device included in the authentication signal, determining whether the authentication signal is transmitted by the electronic device, when the authentication is determined to have been transmitted by the electronic device, determining whether the authentication signal is transmitted for the authentication of the registered device by verifying the infrared-type information, and when the infrared-type information is for the authentication of the registered device, performing an input to a button, for authentication, of the registered device, corresponding to the infrared codeset information.

* * * * *